E. C. AULD AND J. R. CAMPBELL.
METHOD OF TREATING MINE WATER.
APPLICATION FILED MAY 8, 1916.
1,310,382.
Patented July 15, 1919.
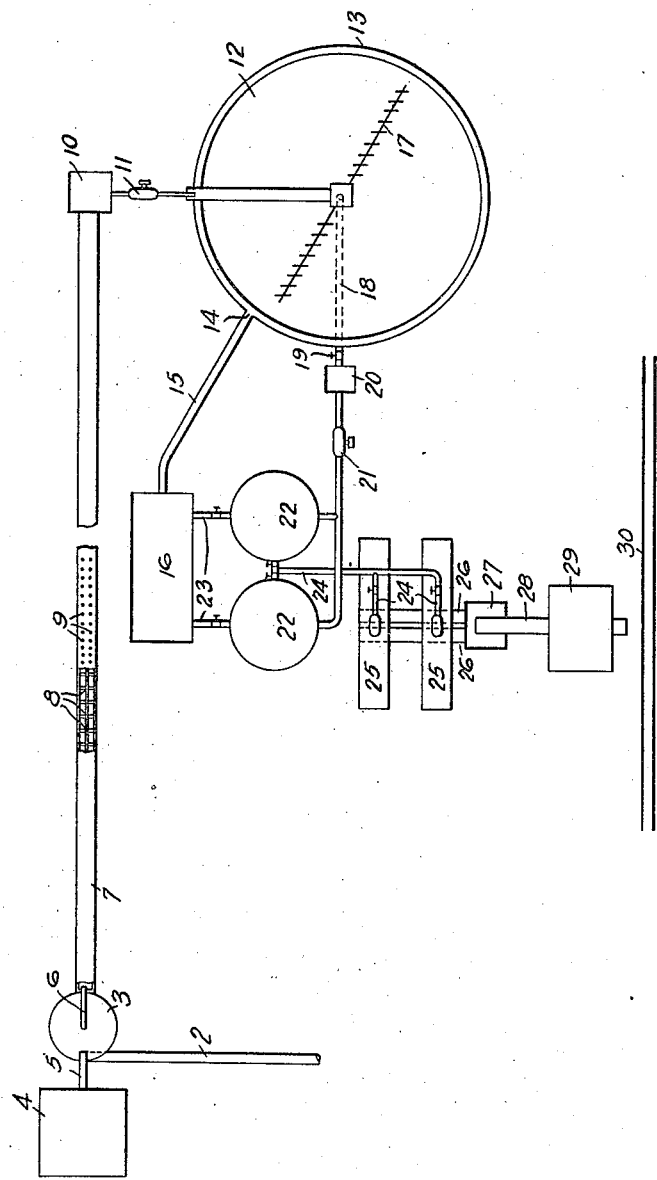

UNITED STATES PATENT OFFICE.

ELGIE C. AULD AND JAMES R. CAMPBELL, OF SCOTTDALE, PENNSYLVANIA.

METHOD OF TREATING MINE-WATER.

1,310,382.　　　　　　Specification of Letters Patent.　　Patented July 15, 1919.

Application filed May 8, 1916.　Serial No. 96,232.

*To all whom it may concern:*

Be it known that we, ELGIE C. AULD and JAMES R. CAMPBELL, citizens of the United States, and residents of Scottdale, in the county of Westmoreland and State of Pennsylvania, have invented certain new and useful Improvements in Methods of Treating Mine-Water, of which the following is a specification.

One object of our invention is the provision of a novel method of treating the large quantities of acid water drained from mines whereby the precipitation of calcium sulfate is effected and the resulting precipitate is recovered as a by-product, adapted for use as a fertilizer and for other purposes.

Another object of the invention is the provision of a novel method of treating the acid mine water whereby calcium sulfate is caused to precipitate and the amount of calcium sulfate in the precipitate is regulated and controlled, and whereby the precipitate is separated from the body of water.

A further object of this invention is the provision of a novel method of treating acid mine water whereby the effectiveness of the neutralizing agent is increased and the time required in neutralizing the water is materially reduced.

The invention consists in the novel series of steps hereinafter described in detail and specifically covered in the appended claims.

The drawing forming part of this specification is a diagrammatic plan showing one arrangement of apparatus adapted for use in carrying out our improved process.

In the accompanying drawing the numeral 2 designates a trough or conduit formed of terra cotta or like acid proof material through which the raw waste or drainage water is conducted from a mine or series of mines and is discharged into a tank or well 3. Preferably the incoming mine water is delivered tangentially from the discharge end of the conduit 2 into the well 3 in the manner shown, to thereby cause a swirling or rotative motion to the water within the well.

At one side of the well is a bin or hopper 4 having a chute or feed mechanism 5 of any suitable construction, by which pulverized or finely divided limestone or other calcareous material is introduced into the water within the well 3 in regulated or measured quantities, the amount of limestone changing with variations in the acidity of the water and being sufficiently in excess of the amount required to neutralize the acid mine water to cause the precipitation of calcium sulfate.

In the Connellsville coal region the total apparent acidity of the mine water averages approximately 200 grains per U. S. gallon, of which from 10 to 20 per cent. is free sulfuric acid ($H_2SO_4$), or from 20 to 40 grains free acid per U. S. gallon. Obviously, the total acidity and the percentage of free sulfuric acid will vary in different mining districts.

The acidity or percentage of free acid in the water being ascertained, and the amount of finely divided limestone or calcareous material necessary to mix with water of a given acidity being previously determined, the quantity of calcareous material will be regulated so as to supply an amount sufficiently in excess of that necessary to neutralize the water in the tank or well to cause the precipitation of calcium sulfate in the desired quantity in the precipitate obtained.

In round numbers, a pound of pulverized or comminuted limestone, when the limestone is substantially pure, is required to neutralize each pound of free sulfuric acid.

The addition of an amount of pulverized limestone approximately equal to twice that required to neutralize the free acid will decompose the iron salt into ferric hydroxid $Fe_2(OH)_6$ and calcium sulfate ($CaSO_4$) which is the form most desirable for fertilizing purposes. The pulverized limestone preferably will be introduced in this proportion of twice the amount necessary to neutralize the acid in carrying out the method forming our invention.

The limestone or other calcareous material mixed with the water and fed into the water by the feed mechanism 5 will be pulverized or ground, preferably to such degree of fineness that 85 per cent. will pass through a 200 mesh sieve, preparatory to being placed in the bin or hopper 4. The introduction of the calcareous material into the water within the well 3 in a finely divided state enables a more intimate mixture being made, rapidly neutralizes the free sulfuric acid in the water and precipitates the iron compounds, or, more accurately, starts or causes incipient precipitation.

The neutralized mine water is then removed from the well 3, preferably by means of a submerged siphon 6, and is discharged thereby from below the level of the water in the well into one end of a covered flume 7. The flume 7 is of considerable length and is provided with a series of baffles 8 and air passages 9 which cause agitation and aeration of the water while traveling through the flume. Preferably the flume is inclined lengthwise at such an angle to the horizontal as to cause the water to flow rapidly through the flume (ordinarily at the rate of about 150 feet per minute).

When found desirable or necessary, means will be employed for discharging compressed air into the neutralizing tank or well 3, and also into the flume 7, in order to increase the extent of aeration and agitation of the water, sufficient aeration being important in causing precipitation of the iron salts.

The water is discharged from the flume 7 into a sump 10 which is connected to the suction inlet of a pump 11 of suitable type and size to handle the volume of water available for treatment by our improved process. The neutralized and now pretty well coagulated water is withdrawn from the sump 10 by the pump 11 and is discharged into a thickener 12 (a "Dorr" thickener preferably being used). In passing through the thickener, precipitation of the iron salts is completed and the sludge or precipitate is separated from the water, care being taken to deliver the water into the thickener without splashing and with the least possible amount of agitation.

The water is permitted to remain in the thickener 12 for about one hour or until the sludge is precipitated to the bottom of the thickener and the water on top becomes clear. The water as clarified overflows into the annular trough 13 encircling the top of the thickener, this trough having a discharge outlet 14 and trough or conduit 15 through which the clear water is led away from the thickener and is delivered into a cistern or storage basin 16.

The sludge or precipitate is allowed to collect on the bottom of the thickener 12 and is gradually worked to the center of the thickener by means of suitable rotary arms or scrapers 17 which are arranged to revolve three or four times per hour or at such slow speed as will avoid agitation of the sludge or precipitate. By allowing a quantity of the sludge to build up or accumulate on the bottom of the thickener 12 the water content of the sludge is lessened.

An alarm system may conveniently be used with the scrapers or arms 17 so as to indicate the thickness of the deposit on the bottom by the stress or strain put on the arms or scrapers when revolving through the sludge.

The thickener 12 is provided with a central discharge opening on its bottom, which is connected to a conduit 18 having a valve 19 thereon, the sludge flowing from the outlet by gravity. The valve 19 may be manipulated so as to permit the sludge to be continuously removed or it may be opened and closed at intervals so as to provide for the intermittent removal of the sludge from the thickener.

The sludge as discharged from the thickener 12 is transferred by the conduit or tunnel 19 to a sludge cistern 20 and a pump 21 is employed to transfer the sludge, as collected in the cistern 20, to secondary or settling tanks 22, 22, wherein the sludge is allowed to settle for a time interval of several hours, the supernatant water being removed through drain pipes 23 on the tanks to the cistern or basin 16 in which the clarified water from the thickener 12 also is collected for further use.

The thickened sludge or precipitate is then delivered by gravity from the tanks 22 through pipes 24 into vacuum or direct heat driers 25, 25, and after being further dehydrated therein to the desired extent, the dehydrated precipitate is discharged from the driers 25 upon conveyers 26. Valves will be provided at suitable points on the pipes 24 to control the flow of sludge therethrough. The dehydrated precipitate as discharged from the driers 25 falls upon charged from the driers 25 falls upon conveyers 26 by which it is delivered into a collecting pit 27 and the elevator 28 in the pit transfers the precipitate into the storage bin or hopper 29 from which it is loaded by gravity into cars positioned on the railway track 30.

A typical analysis of the dehydrated precipitate or material obtained in carrying out our novel process is—

|  | Per cent. |
|---|---|
| Moisture at 105° C. | 15.10 |
| Water of constitution | 7.67 |
| Silica ($SiO_2$) | 6.25 |
| Alumina ($Al_2O_3$) | 5.60 |
| Ferric oxid ($Fe_2O_3$) | 24.38 |
| Lime (CaO) | 10.30 |
| Magnesia (MgO) | .50 |
| Carbon dioxid ($CO_2$) | .20 |
| Organic compounds | 1.25 |
| Calcium sulfate ($CaSO_4$) | 25.00 |
| Phosphoric acid ($P_2O_5$) | 3.75 |
|  | 100.00 |

This material is found to be an excellent fertilizer adapted for use without further treatment. The fertilizer is cheaply made in large quantities as a new article of manufacture, a product obtained in purifying acid mine water.

The advantages of our invention will be apparent to those skilled in the art. The steps of our improved process provide for the most effective use of the neutralizing agent and by feeding the limestone into the acid mine water in a finely divided state and in quantities regulated and determined by the degree of acidity of the water being treated the precipitation of calcium sulfate is accomplished to the desired degree, while a material having the desired calcium sulfate content is obtained.

Modifications in the construction and arrangement of apparatus used in carrying out our improved process may be made within the scope of our invention.

The tanks or cisterns, the driers, and other apparatus may be arranged to discharge the water from one to the succeeding part of the apparatus by gravity, and this way avoid the use of pumps for lifting the water. The centrifuge and filter wheel may or may not be used, and any suitable means may be employed in crushing or powdering the limestone used in neutralizing the water, and for drying the precipitate by the direct application of heat, and other changes may be made without departing from our invention as defined in the appended claims.

We claim:—

1. In the treatment of acid mine water, the steps consisting in mixing finely divided calcareous material with the water to thereby neutralize the water, adding an excess of calcerous material to precipitate calcium sulfate, then agitating and aerating the treated water to promote precipitation, and then precipitating the sludge and separating the precipitate from the body of the water.

2. In the treatment of acid mine water, the steps consisting in mixing finely divided calcerous material with the water to thereby neutralize the water, adding an excess of calcareous material to precipitate calcium sulfate, then agitating and aerating the treated water to promote precipitation, then precipitating the sludge and separating the precipitate from the body of the water, and then drying the precipitated sludge.

3. In the treatment of acid mine water, the steps consisting in mixing finely divided calcareous material with the water in quantities to thereby neutralize the water, adding an excess of calcareous material to precipitate calcium sulfate, then agitating and aerating the over-neutralized water to promote precipitation, then precipitating the sludge and separating the precipitate from the body of the water, and regulating the quantity of calcareous material added to the acid mine water with variations in the acidity of the water to thereby control the precipitation of calcium sulfate.

4. In the treatment of acid mine water, the steps consisting in mixing regulated quantities of finely divided calcareous material with the water to thereby neutralize the water, adding an excess of calcareous material to form calcium sulfate, then agitating and aerating the treated water to promote precipitation, then precipitating the sludge and separating the precipitate from the body of the water, and then calcining the precipitated sludge.

5. In the treatment of acid mine water, the steps consisting in mixing regulated quantities of finely divided calcareous material with the water to thereby neutralize the free acid, adding an excess of the calcareous material to cause the precipitation of calcium sulfate, then agitating and aerating the treated water to promote precipitation, then precipitating the sludge and separating the precipitate from the body of the water, and then removing the free water in the precipitated sludge.

In testimony whereof we have hereunto set our hands.

ELGIE C. AULD.
JAMES R. CAMPBELL.